(12) United States Patent
Yamaguchi

(10) Patent No.: US 10,214,193 B2
(45) Date of Patent: Feb. 26, 2019

(54) HYDRAULIC BRAKING DEVICE

(71) Applicant: ADVICS CO., LTD., Kariya-shi, Aichi-ken (JP)

(72) Inventor: Tomoyuki Yamaguchi, Kiyosu (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/326,153

(22) PCT Filed: Jul. 14, 2015

(86) PCT No.: PCT/JP2015/071046
§ 371 (c)(1),
(2) Date: Jan. 13, 2017

(87) PCT Pub. No.: WO2016/010164
PCT Pub. Date: Jan. 21, 2016

(65) Prior Publication Data
US 2017/0203740 A1    Jul. 20, 2017

(30) Foreign Application Priority Data
Jul. 15, 2014  (JP) .................................. 2014-145291

(51) Int. Cl.
*B60T 13/00* (2006.01)
*B60T 13/14* (2006.01)
(Continued)

(52) U.S. Cl.
CPC ............ *B60T 13/143* (2013.01); *B60T 7/042* (2013.01); *B60T 11/236* (2013.01);
(Continued)

(58) Field of Classification Search
CPC ...... B60T 8/441; B60T 13/143; B60T 13/144; B60T 13/145
See application file for complete search history.

(56) References Cited

U.S. PATENT DOCUMENTS 4,179,980 A * 12/1979 Kito .................. B60T 13/144
137/625.12
4,468,927 A *  9/1984 Farr .................. B60T 13/144
60/547.1
(Continued)

FOREIGN PATENT DOCUMENTS

JP    2002-310309 A   10/2002
JP    2006-038036 A    2/2006
(Continued)

OTHER PUBLICATIONS

International Search Report (PCT/ISA/210) dated Oct. 20, 2015, by the Japan Patent Office as the International Searching Authority for International Application No. PCT/JP2015/071046.
(Continued)

*Primary Examiner* — Nicholas J Lane
(74) *Attorney, Agent, or Firm* — Buchanan Ingersoll & Rooney PC

(57) ABSTRACT

This hydraulic braking device is provided with: a tubular cylinder; an assisting piston, which is housed in the cylinder so as to be able to move reciprocally, faces a reservoir formed inside the cylinder, and assists a master piston, in a master cylinder, that generates hydraulic pressure for generating a braking force by reciprocally moving from one side to the other as a result of a fluid flowing into the reservoir from a supply source; and a seal member, which is elastically deformable and which seals the reservoir. When the assisting piston is at a location on one side, the reservoir is compartmentalized into a first chamber that communicates with the supply source, and a second chamber that communicates with the first chamber through a restricting flow passage, and the seal member seals the second chamber.

3 Claims, 7 Drawing Sheets

(51) Int. Cl.
*B60T 7/04* (2006.01)
*B60T 13/66* (2006.01)
*B60T 13/68* (2006.01)
*B60T 11/236* (2006.01)
*B60T 13/74* (2006.01)
*B60T 8/44* (2006.01)

(52) U.S. Cl.
CPC .......... *B60T 13/145* (2013.01); *B60T 13/146* (2013.01); *B60T 13/147* (2013.01); *B60T 13/662* (2013.01); *B60T 13/686* (2013.01); *B60T 13/745* (2013.01); *B60T 8/441* (2013.01)

(56) References Cited

U.S. PATENT DOCUMENTS

| | | | |
|---|---|---|---|
| 4,566,275 A * | 1/1986 | Farr | B60T 13/145 60/554 |
| 5,897,175 A * | 4/1999 | Terazawa | B60T 7/12 303/113.4 |
| 2003/0024581 A1 | 2/2003 | Nakamura et al. | |
| 2012/0248860 A1* | 10/2012 | Miyata | B60T 7/042 303/10 |
| 2015/0013808 A1 | 1/2015 | Yamaguchi | |

FOREIGN PATENT DOCUMENTS

| | | |
|---|---|---|
| JP | 2014-065455 A | 4/2014 |
| WO | WO 2013/111859 A1 | 8/2013 |

OTHER PUBLICATIONS

Written Opinion (PCT/ISA/237) dated Oct. 20, 2015, by the Japan Patent Office as the International Searching Authority for International Application No. PCT/JP2015/071046.

* cited by examiner

HYDRAULIC BRAKING DEVICE

TECHNICAL FIELD

The present invention relates to a hydraulic braking device.

BACKGROUND ART

Conventionally, there is a known hydraulic cylinder having the structure that moves a piston by supplying a hydraulic fluid (such as oil, water, or fluid) to or discharge a hydraulic fluid from a hydraulic chamber or the structure that pumps or drains a hydraulic fluid by moving a piston. In such a hydraulic cylinder, since an impact (so-called "oil impact") caused by behavior of a hydraulic fluid may occur, techniques for reducing such an impact are proposed (for example, PTL 1).

CITATION LIST

Patent Literature

PTL 1: JP-A-2006-38036

SUMMARY OF INVENTION

Technical Problem

A use example of a hydraulic cylinder is a hydraulic booster assisting the thrust of a master cylinder in the braking device of an automobile. In this case, the boost piston of the hydraulic cylinder included in the hydraulic booster moves by receiving the hydraulic pressure of a hydraulic fluid (brake fluid) flowing from a high pressure supply source and assists the thrust of a master piston. An "oil impact" may also occur during startup of the hydraulic booster. However, a conventional technique for reducing an oil impact provides impact mitigation effects by restricting the flow of the hydraulic fluid immediately before a moving piston stop, as disclosed in PTL 1. Accordingly, this technique cannot be used to reduce an "oil impact" that occurs during the startup of the hydraulic booster in which the boost piston stops. An object of the invention is to provide a hydraulic braking device that can reduce an oil impact that occurs when, for example, the thrust of the master cylinder is assisted.

Solution to Problem

A hydraulic braking device according to the invention includes, for example, a tubular cylinder, an assisting piston housed in the cylinder so as to be movable reciprocally, the assisting piston facing a fluid chamber formed in the cylinder, the assisting piston assisting a master piston of a master cylinder generating a hydraulic pressure for generating a braking force when moved from a location on one side to another side in a reciprocal movement direction by a fluid flowing into the fluid chamber from a supply source, and an elastically deformable seal member sealing the fluid chamber, in which, when the assisting piston is present at the location on the one side, the fluid chamber is partitioned into a first chamber and a second chamber, the first chamber communicating with the supply source, the second chamber communicating with the first chamber via a restricting flow path, and the seal member seals the second chamber.

In addition, in the hydraulic braking device, for example, when the assisting piston is present at the location on the one side and the fluid is flowing from the first chamber to the second chamber via the restricting flow path in response to elastic deformation of the seal member, the assisting piston starts moving from the location on the one side to the other side.

In addition, in the hydraulic braking device, for example, when the assisting piston is present at the location on the one side, the restricting flow path is formed between an end portion of the assisting piston and an end surface on the one side of the cylinder, the end surface facing, the end portion.

In addition, in the hydraulic braking device, for example, the seal member is annular and provided with a groove, the groove being opened to a side surface in contact with the fluid, the groove extending in a circumferential direction.

In addition, in the hydraulic braking device, for example, the cylinder includes a tubular cylinder member and a plug, at least apart of the plug being housed in a tube of the cylinder member, at least a part of a cylindrical inner surface of the cylinder member faces the second chamber, and the seal member seals a gap between the cylinder member and the plug.

DESCRIPTION OF EMBODIMENTS

An exemplary embodiment of the invention will be disclosed below. The structure of the embodiment and the actions and results (effects) provided by the structure are only examples. The invention may be achieved by a structure other than that disclosed by the following embodiment. In addition, according to the invention, at least one of various effects (including derivative effects) obtained by the structure can be obtained.

The hydraulic braking device according to the embodiment includes, for example, a hydraulic booster and assists the thrust force of a master cylinder that supplies a hydraulic fluid to calipers grasping wheel discs rotating together with the wheels of a vehicle and supplies a hydraulic fluid to brake shoes pressing brake drums.

Figure 1:
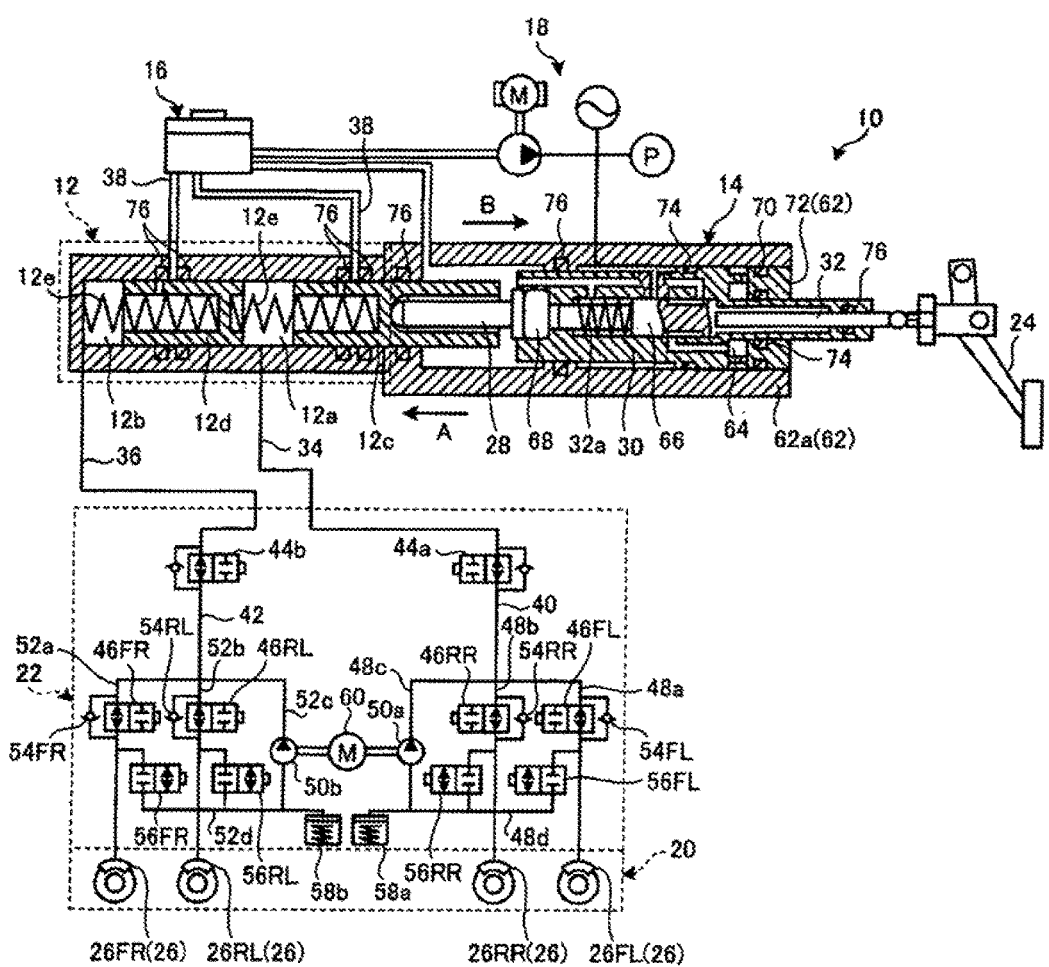
FIG. 1 is a structural diagram schematically illustrating a braking system including a hydraulic braking device according to an embodiment.

FIG. 1 is a structural diagram schematically illustrating a braking system including the hydraulic braking device according to the embodiment. A braking system 10 illustrated in FIG. 1 mainly includes a master cylinder 12, a hydraulic booster 14, a reservoir tank 16, a hydraulic source (supply source) 18, a brake device 20, a backflow type pressure regulating unit (hydraulic actuator) 22, and the like. The braking system 10 includes a brake ECU (electronic control unit, not illustrated) functioning as a control unit for controlling the operation of control valves, motors, and the like described later. In addition, the backflow type pressure regulating unit 22 illustrated in FIG. 1 is an example of an actuator achieving an anti-lock brake system (ABS) and having a simple structure.

When the driver depresses a brake pedal 24, the master cylinder 12 feeds a hydraulic fluid (brake fluid, brake liquid, brake oil, or fluid) to a wheel cylinder 26 of the brake device 20 while receiving an assisting force from the hydraulic booster 14. The master cylinder 12 includes a primary chamber 12a, a secondary chamber 12b, a primary piston 12c (first master piston), a secondary piston 12d (second master piston), and a spring 12e. Although, for example, all brake devices in the brake device 20 are disc brakes in FIG. 1, drum brakes may be used in other embodiments. In addition, disc brakes may be used for the front wheels and drum brakes may be used for the rear wheels.

The master cylinder 12 is a tandem type cylinder partitioned into the primary chamber 12a and the secondary chamber 12b by the primary piston 12c and the secondary piston 12d. A booster rod 28 of the hydraulic booster 14 is connected to the primary piston 12c. Details on the hydraulic booster 14 will be described later. When the brake pedal 24 is depressed, a boost piston 30 generates an assisting force according to the depression force and the booster rod 28 is moved by the assisting force. As a result, movement of the booster rod 28 moves the primary piston 12c in the direction indicated by arrow A in the drawing. The booster rod 28 is also operable by the operation of a push rod 32 extending from the brake pedal 24. The booster rod 28 is also moved in the direction indicated by arrow A by the depression force of the driver transferred via the push rod 32.

When the brake pedal 24 is not depressed, the primary piston 12c pushes the booster rod 28 and the boost piston 30 to the initial position side (the direction indicated by arrow B, one side in the reciprocal movement direction) by receiving an elastic force from the spring 12e. The secondary piston 12d also pushes the booster rod 28 and the boost piston 30 to the initial position side via the primary piston 12c by receiving an elastic force from the spring 12e. When the brake pedal 24 is not depressed, the push rod 32 pushes the brake pedal 24 to the initial position side (the direction indicated by arrow B) by receiving an elastic force from a spring 32a.

When the driver depresses the brake pedal 24, the hydraulic booster 14 generates an assisting force, the booster rod 28 moves in the direction indicated by arrow A, and the primary piston 12c and the secondary piston 12d are pushed to the operation position side (the direction indicated by arrow A, the other side in the reciprocating motion direction). This pushes the hydraulic fluid out of the primary chamber 12a and the secondary chamber 12b (the master cylinder pressure is generated).

The primary chamber 12a and the secondary chamber 12b are provided with a passage 34 and a passage 36 extending toward the backflow type pressure regulating unit 22. In addition, the master cylinder 12 is connected to the reservoir tank 16 in which the hydraulic fluid is stored. When the brake pedal is in the initial position, the reservoir tank 16 communicates with the primary chamber 12a and the secondary chamber 12b via a passage 38 to supply the hydraulic fluid in the master cylinder 12 or store the excess hydraulic fluid in the master cylinder 12.

The backflow type pressure regulating unit 22 has a first pipe system to which the passage 34 is connected and a second pipe system to which the passage 36 is connected. The backflow type pressure regulating unit 22 is provided with a passage 40 connecting the primary chamber 12a of the master cylinder 12 to a wheel cylinder 26FL and a wheel cylinder 26RR. In addition, the backflow type pressure regulating unit 22 is provided with a passage 42 connecting the secondary chamber 12b to a wheel cylinder 26FR and a wheel cylinder 26RL. One end of the passage 40 is coupled to the passage 34 and the other end of the passage 40 is connected to an individual passage 48a in which a holding valve 46FL is provided, an individual passage 48b in which a holding valve 46RR is provided, and an individual passage 48c in which a pump 50a is provided. Similarly, one end of the passage 42 is coupled to the passage 36 and the other end of the passage 42 is connected to an individual passage 52a in which a holding valve 46FR is provided, an individual passage 52b in which a holding valve 46RL is provided, and an individual passage 52c in which a pump 50b is provided.

A master cut valve 44a is provided at some midpoint in the passage 40. The master cut valve 44a is a normally open electromagnetic control valve that includes a solenoid and spring for ON-OFF control, is kept in a close state by an electromagnetic force generated by the solenoid when receiving a prescribed control current, and is put in an open state by a biasing force of the spring when the solenoid is not energized. The master cut valve 44a in the open state enables the hydraulic fluid to be flow bidirectionally between the passage 34 and the passage 40. When the prescribed control current flows through the solenoid and the master cut valve 44a is closed, a flow of the hydraulic fluid between the passage 34 and the passage 40 is blocked. Similarly, a master cut valve 44b is provided at some midpoint in the passage 42. The master cut valve 44b in the open state enables the hydraulic fluid to flow bidirectionally between the passage 36 and the passage 42. When the prescribed control current flows through the solenoid and the master cut valve 44b is closed, a flow of the hydraulic fluid between the passage 36 and the passage 42 is blocked.

Each of the holding valves 46FL, 46RR, 46FR, and 46RL in the individual passages 48a, 48b, 52a, and 52b is a normally open electromagnetic control valve including a solenoid and spring for ON-OFF control and is opened when the solenoid is not energized. The holding valves 46FL, 46RR, 46FR, and 46RL in the open state enable the hydraulic fluid to flow bidirectionally. That is, the hydraulic fluid supplied from the primary chamber 12a can flow to the wheel cylinders 26FL and 26RR via the passage 34. In addition, the hydraulic fluid supplied from the primary chamber 12b can flow to the wheel cylinders 26FR and 26RL via the passage 36. Conversely, the brake liquid can be returned from the wheel cylinders 26FL and 26RR to the primary chamber 12a and the hydraulic fluid can be returned from the wheel cylinders 26FR and 26RL to the secondary chamber 12b.

When the solenoid is energized and the holding valves 46FL and 46RR are opened, flows of the hydraulic fluid between the primary chamber 12a and the wheel cylinders 26FL and 26RR are blocked. In addition, when the solenoid is energized and the holding valves 46FR and 46RL are closed, flows of the hydraulic fluid between the secondary chamber 12b and the wheel cylinders 26FR and 26RL are blocked. Check valves 54FL, 54RR, 54FR, and 54RL are provided in parallel to the holding valves 46FL, 46RR, 46FR, and 46RL, respectively. The check valves 54FL and 54RR permit only the flows of the hydraulic fluid from the wheel cylinders 26FL and 26RR to the passage 34 and prevent the reverse flows. Accordingly, when the hydraulic fluid is returned from the wheel cylinder 26FL or the wheel cylinder 26RR to the primary chamber 12a, the check valve 54FL or the check valve 54RR forms a return flow path like a return flow path via the holding valve 46FL or the holding valve 46RR to enable the hydraulic fluid to be rapidly returned to the primary chamber 12a. In addition, the check valves 54FR and 54RL permit only the flows of the hydraulic fluid from the wheel cylinders 26FR and 26RL to the passage 36 and prevent the reverse flows. Accordingly, when the hydraulic fluid is returned from the wheel cylinder 26FR or the wheel cylinder 26RL to the secondary chamber 12b, the check valve 54FR or the check valve 54RL forms a return flow path like a return flow path via the holding valve 46FR or the holding valve 46RL to enable the hydraulic fluid to be rapidly returned to the secondary chamber 12b.

In a part closer to the wheel cylinder 26FL than the holding valve 46FL and the check valve 54FL in the individual passage 48a, a pressure reducing valve 56FL is provided in parallel to the wheel cylinder 26FL. In addition, in the part closer to the wheel cylinder 26RR than the holding valve 46RR and the check valve 54RR in the individual passage 48b, a pressure reducing valve 56RR is provided in parallel to the wheel cylinder 26R. On the downstream side of the pressure reducing valves 56FL and 56RR, an individual passage 48d connected to a flow path reservoir tank 58a is formed. Similarly, in the part closer to the wheel cylinder 26FR than the holding valve 46FR and the check valve 54FR in the individual passage 52a, a pressure reducing valve 56FR is provided in parallel to the wheel cylinder 26FR. In addition, in the part closer to the wheel cylinder 26RL than the holding valve 46RL and the check valve 54RL in the individual passage 52b, a pressure reducing valve 56RL is provided in parallel to the wheel cylinder 26RL. On the downstream side of the pressure reducing valves 56FR and 56RL, an individual passage 52d connected to a flow path reservoir tank 58b is formed.

Each of the pressure reducing valves 56FL, 56RR, 56FR, and 56RL is a normally close electromagnetic control valve having a solenoid and spring for ON-OFF control and is closed when the solenoid is not energized. When the pressure reducing valves 56FL and 56RR are in the close state, a flow of the hydraulic fluid to the flow path reservoir tank 58a is blocked. When the solenoid is energized and the pressure reducing valves 56FL and 56RR are opened, a flow of the hydraulic fluid to the flow path reservoir tank 58a is permitted. When the pressure reducing valves 56FR and 56RL are in the close state, a flow of the hydraulic fluid to the flow path reservoir tank 58b is blocked. When the solenoid is energized and the pressure reducing valves 56FR and 56RL are opened, a flow of the hydraulic fluid to the flow path reservoir tank 58b is permitted. The flow path reservoir tanks 58a and 58b temporarily store the hydraulic fluid returned from the wheel cylinder 26 during ABS control. The individual passages 48c and 52c are connected to the flow path reservoir tanks 58a and 58b, respectively. The individual passage 48c is provided with the pump 50a and check valves (not illustrated) are provided before and after the pump 50a. The individual passage 52c is provided with the pump 50b and check valves (not illustrated) are provided before and after the pump 50b. The pumps 50a and 50b are driven by a motor 60 and pumps the hydraulic fluid from the flow path reservoir tanks 58a and 58b when, for example, the brake pedal 24 is not depressed. That is, when the hydraulic fluid does not flow from the primary chamber 12a or the secondary chamber 12b to the wheel cylinders 26FL, 26RR, 26FR, and 26RL and the like, the hydraulic fluid is returned to the primary chamber 12a or the secondary chamber 12b. As a result, the required storage amount of the hydraulic fluid in the reservoir tank 16 is kept. The check valves provided before and after the pumps 50a and 50b prevent the hydraulic fluid from reversely flowing from the master cylinder 12 to the flow path reservoir tanks 58a and 58b.

Figure 2:
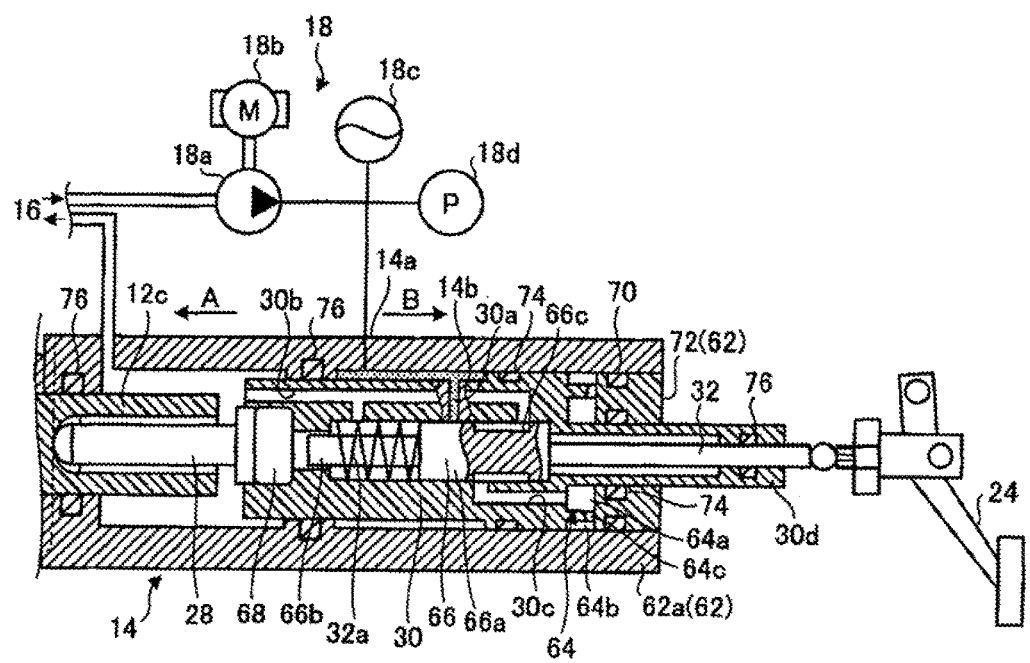
FIG. 2 is an explanatory diagram illustrating the state of the hydraulic braking device according to the embodiment before assistance by the hydraulic braking device.

Next, details on the hydraulic booster 14 will be described with reference to FIG. 1 and FIG. 2, which is an enlarged view of the hydraulic booster 14.

The hydraulic booster 14 has, in a cylinder 62, the boost piston (assisting piston) 30, which is reciprocally movable in the directions indicated by arrows A and B, and the booster rod 28. The boost piston 30 also functions as a regulating mechanism (regulator) that regulates a hydraulic fluid supplied from the hydraulic source 18 to a value corresponding to the amount of operation of the brake pedal 24. In addition, the end surface of the boost piston 30 and the inner wall surface of the cylinder 62 form a fluid chamber (assist chamber) 64 into which the hydraulic fluid supplied from the hydraulic source 18 flows. The hydraulic pressure (boost pressure) of the hydraulic fluid in the fluid chamber 64 moves the boost piston 30 in the direction indicated by arrow A against a biasing force by the spring 12e and the like. That is, the hydraulic pressure (pressure) of the fluid chamber 64 causes the boost piston 30 to generate an assisting force for assisting the driving of the booster rod 28 in the direction indicated by arrow A. The booster rod 28 driven by the assisting force in the direction indicated by arrow A presses the primary piston 12c of the master cylinder 12 in the direction indicated by arrow A. As a result, the primary piston 12c and the secondary piston 12d are moved by an input including the assisting force and pushes (generates a hydraulic pressure) the hydraulic fluid. The pushed hydraulic fluid flows into the brake device 20 via the backflow type pressure regulating unit 22 (wheel cylinder 26) and the wheel cylinder 26 is operated to generate a braking force.

The hydraulic source 18 includes a pump 18a, a motor 18b, the accumulator 18c, a pressure sensor 18d, and the like. The container constituting the accumulator 18c stores pressure accumulation gas (for example, nitrogen) sealed in a rubber film or the like. Then, the hydraulic fluid discharged from the pump 18a is pressure-fed to the accumulator 18c, an open-close valve (not illustrated) is closed to contain the hydraulic fluid in the accumulator 18c, and the hydraulic fluid is accumulated as the pressure energy of the charged gas. The hydraulic fluid is released from the accumulator 18c by opening the open-close valve to provide the accumulator pressure. The pump 18a has the motor 18b as a driving source and has a suction port connected to the reservoir tank 16 and a discharge port connected to the accumulator 18c. The pump 18a keeps the accumulator pressure within a setting range to be maintained. Based on the measurement value by the pressure sensor 18d, the brake ECU turns on the pump 18a to raise the accumulator pressure when the accumulator pressure becomes less than the lower limit of the setting range and turns off the pump 18a to end the pressurization when the accumulator pressure exceeds the upper limit of the setting range.

The discharge port of the accumulator 18c is connected to a high pressure connection port 14a of the hydraulic booster 14 so as to supply the highly pressurized hydraulic fluid to the hydraulic booster 14. A high pressure introduction chamber 14b is formed between the inner wall surface of the cylinder 62 and the outer wall surface of the boost piston 30 so as to surround the outer peripheral surface of the boost piston 30 and receives the highly pressurized hydraulic fluid around the boost piston 30. A spool 66 coupled to the push rod 32 is housed in the boost piston 30 so as to be reciprocally movable in the axial direction. The boost piston 30 is provided with at least one high pressure introduction path 30a in the radial direction for introducing the highly pressurized hydraulic fluid from the outer peripheral surface side to the inner peripheral surface side in which the spool 66 housed. The length in the axial direction of the high pressure introduction chamber 14b is set to a value equal to or more than the reciprocating movement distance of the boost piston so that the high pressure introduction path 30a can communicate with the high pressure introduction chamber 14b regardless of the position of the boost piston 30. In addition, the boost piston 30 is provided with a booster backflow path 30b along the axial direction of the boost piston 30. The booster backflow path 30b is used to flow back the excess hydraulic fluid in response to reduction in the volume of the fluid chamber 64 to the reservoir tank 16 caused when the brake pedal 24 is returned to the initial position.

The spool 66 is configured by a large diameter portion 66a forming a spool valve element and a small diameter portion 66b. The outer peripheral surface of the large diameter portion 66a is provided with an annular groove 66c that communicates with the booster backflow path 30b when the brake pedal 24 is returned to the initial position and breaks the communication with the booster backflow path 30b and communicates with the high pressure introduction path 30a when the brake pedal 24 is depressed. When moving in the direction indicated by arrow A, the spool 66 first breaks the communication between the booster backflow path 30b and the annular groove 66c and then gradually increases the width of communication between the high pressure introduction path 30a and the annular groove 66c. That is, depending on the depression of the brake pedal 24, the spool 66 widens the spool valve opening and adjusts the flow amount of the hydraulic fluid supplied from the accumulator 18c. The spring 32a is disposed around the small diameter portion 66b and gives a biasing force between the inner wall surface in the axial direction of the boost piston 30 and the large diameter portion 66a. As a result, when depression of the brake pedal 24 is released, the push rod 32 and the spool 66 are pushed back in the direction indicated by arrow B to return the brake pedal 24 to the initial position. At this time, the movement of the spool 66 causes the annular groove 66c to communicate with the booster backflow path 30b to enable the hydraulic fluid to flow back to the reservoir tank 16 as described above.

The boost piston 30 has a communication assistance path 30c in a position different from that of the booster backflow path 30b. The annular groove 66c communicates with the fluid chamber 64 through the communication assistance path 30c. The communication assistance path 30c can always communicate with the annular groove 66c. When the annular groove 66c communicates with the high pressure introduction path 30a, the hydraulic fluid from the accumulator 18c flows into the fluid chamber 64 and the hydraulic pressure rises. In addition, when the annular groove 66c communicates with the booster backflow path 30b, the hydraulic fluid flows back to the reservoir tank 16 from the fluid chamber 64.

The basic operation of the hydraulic booster 14 configured as described above will be described.

Figure 3:
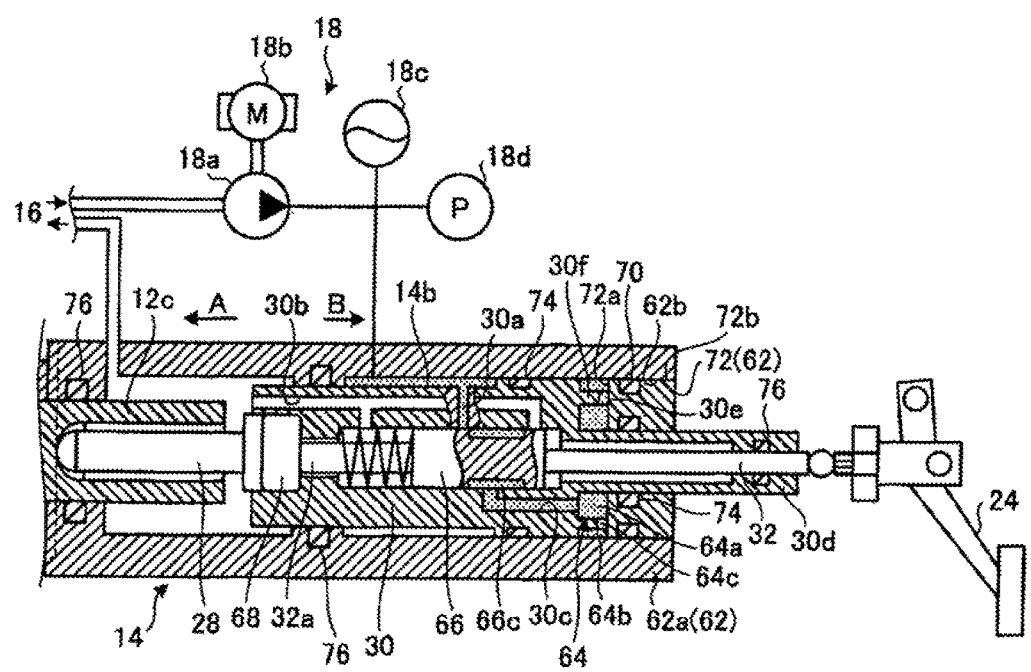
FIG. 3 is an explanatory diagram illustrating the state until an assisting piston starts moving after a supply source starts supplying a fluid to the hydraulic braking device according to the embodiment.

When the brake pedal 24 is depressed, the push rod 32 moves in the direction indicated by arrow A and the spool 66 also moves in the direction indicated by arrow A as illustrated in FIG. 3. That is, the booster backflow path 30b and the annular groove 66c having communicated with each other when the brake pedal 24 is in the initial position make a transition to the break state and communication between the annular groove 66c and the high pressure introduction path 30a starts. As a result, the hydraulic fluid supplied from the accumulator 18c flows into the fluid chamber 64 via the high pressure introduction chamber 14b, the annular groove 66c, and the communication assistance path 30c. Although the fluid chamber 64 is filled with the hydraulic fluid in the state in which the boost piston 30 stops at the initial position, if the seal member disposed to liquid-tightly seal the fluid chamber 64 elastically deforms, the volume of the fluid chamber 64 increases and the hydraulic fluid flows into it. The inflow of the hydraulic fluid before the start of the movement of the boost piston 30 continues until the elastic deformation of the elastic member stops. While the hydraulic fluid flows before the start of the movement of the boost piston 30, the pressure in the fluid chamber 64 moderately changes. However, after the hydraulic fluid stops flowing, the pressure in the fluid chamber 64 suddenly rises. That is, until the amount (the amount of the hydraulic fluid allowed to be input to the fluid chamber 64, the amount of fluid consumption) of fluid consumed by the elastic deformation of the elastic member is reached, the pressure in the fluid chamber 64 is prevented from rising. When the amount of fluid consumption by the elastic member is reached, the pressure in the fluid chamber 64 rises, and the startup hydraulic pressure (the pressure overcoming the biasing force in the direction indicated by arrow B from the master cylinder 12) of the boost piston 30 is reached, then the boost piston 30 starts moving in the direction indicated by arrow A. When the boost piston 30 starts moving, the end portion of the boost piston 30 separates from an end surface 72a of a plug 72, so the fluid chamber 64 is expanded in response to the movement of the boost piston 30 and the hydraulic fluid flows into the fluid chamber 64 again. As described above, the flow amount (restriction amount) of the hydraulic fluid when the high pressure introduction path 30a communicates with the annular groove 66c corresponds to the amount of operation of the brake pedal 24. Accordingly, as the amount of depression of the brake pedal 24 increases, after the startup of the boost piston 30, the amount of the hydraulic fluid flowing into the fluid chamber 64 increases and the amount of movement of the boost piston 30 for assistance increases.

A disc 68 made of an elastic member such as, for example, rubber is disposed in the end portion of the boost piston 30 close to the primary piston 12c and the disc 68 makes contact with the booster rod 28. Accordingly, when the boost piston 30 moves in the direction indicated by arrow A by receiving an assisting force generated in the fluid chamber 64, the booster rod 28 also moves in the direction indicated by arrow A. As a result, the booster rod 28 moves the primary piston 12c. When the primary piston 12c moves, the hydraulic fluid in the primary chamber 12a is pushed toward the brake device 20. In addition, the secondary piston 12d moves in the direction indicated by arrow A because of an increase in the hydraulic pressure in the primary chamber 12a, the hydraulic fluid in the secondary chamber 12b is pushed toward the brake device 20, and a braking force is generated in the brake device 20. The push rod 32 and the spool 66 that move in the direction indicated by arrow A by depression of the brake pedal 24 make contact with the disc 68 and, if the brake pedal 24 is further depressed, the small diameter portion 66b of the spool 66 pushes the booster rod 28 in the direction indicated by arrow A. That is, the booster rod 28 moves in the direction indicated by arrow A by the force obtained by combining the assisting force generated in the fluid chamber 64 with the depression force of the brake pedal 24 to provide the master cylinder 12 with an operation force.

When the depression force of the brake pedal 24 is released, the spool 66 is pushed back in the direction indicated by arrow B by the biasing force of the spring 32a, the communication between the annular groove 66c and the high pressure introduction path 30a is released (the spool valve is closed), and the annular groove 66c communicates with the booster backflow path 30b. That is, the fluid chamber 64 is connected to the reservoir tank 16 via the communication assistance path 30c, the annular groove 66c, and the booster backflow path 30b. Since the primary piston 12c and the secondary piston 12d are biased in the direction indicated by arrow B by the spring 12e, when the depression of the brake pedal 24 is released, the booster rod 28 and the boost piston 30 are returned to the initial positions. Since the volume of the fluid chamber 64 is reduced as a result, the hydraulic fluid in the fluid chamber 64 flows back to the reservoir tank 16. Since the spool 66 is also biased by the spring 32a in the direction indicated by arrow B and returned back to the initial position at this time, the brake pedal 24 is also returned back to the initial position.

As described above, before the boost piston 30 starts up (immediately before the movement in the direction indicated by arrow A starts), the brake pedal 24 is depressed, the spool 66 moves in the direction indicated by arrow A, and the hydraulic fluid flows into the fluid chamber 64 from the accumulator 18c. Then, when the amount of fluid consumption of the fluid chamber 64 is reached and the flow of the hydraulic fluid stops, the impact phenomenon corresponding to the amount of the hydraulic fluid having flowed until then may be caused. This is a so-called "oil impact" and occurs, for example, when the speed of liquid suddenly changes (sudden change from a flow state to a stop state) and an oil impact causes vibrations or abnormal noises.

Therefore, the hydraulic booster 14 (hydraulic braking device) according to the embodiment has a structure for reducing an oil impact. Specifically, as illustrated in FIG. 2, before the boost piston 30 moves in the direction indicated by arrow A, the fluid chamber 64 is partitioned into a first chamber 64a and a second chamber 64b and the first chamber 64a communicates with the second chamber 64b via a restricting flow path 64c. The second chamber 64b is positioned so as to surround the first chamber 64a (that is, positioned radially outward (outer periphery side) in the center axis of the cylinder 62 of the first chamber 64a). In addition, at least a part of a cylindrical inner surface 62b (inner peripheral surface) of a cylinder member 62a, which is a component of the cylinder 62, faces the second chamber 64b.

In the structure according to the embodiment, an oil impact during startup of the boost piston 30 can be reduced. First, the restricting flow path 64c restricts the amount of the hydraulic fluid flowing from the first chamber 64a to the second chamber 64b to make a rise in the pressure in the first chamber 64a on the upstream side of the restricting flow path 64c faster than a rise in the pressure in the second chamber 64b on the downstream side of the restricting flow path 64c. This causes the pressure in the first chamber 64a to reach the startup hydraulic pressure earlier and the boost piston 30 to start movement earlier. In addition, by partitioning into the first chamber 64a and the second chamber 64b via the restricting flow path 64c, the elastic member (for example, the seal member) determining the flow amount of the hydraulic fluid in the fluid chamber 64 is divided into the seal member (seal member 74) for the first chamber 64a and the seal members (seal member 70 and seal member 74) for the second chamber 64b. Therefore, the amount (the volume of reduction of the seal member 74) of fluid consumption in the part close to the first chamber 64a can become smaller, the elastic deformation of the seal member 74 facing the first chamber 64a stops earlier, the pressure in the first chamber 64a rises earlier, and the boost piston easily starts moving earlier. In contrast, since partitioning into the first chamber 64a and the second chamber 64b is performed via the restricting flow path 64c, a rise in the pressure in the second chamber 64b becomes slower than a rise in the pressure in the first chamber 64a. Accordingly, the timing at which the elastic deformation of the seal members 70 and 74 facing the second chamber 64b stops can be delayed from the timing at which the elastic deformation of the seal member 74 facing the first chamber 64a stops. The seal member 70 facing the second chamber 64b is disposed between the cylinder 62 and the plug 72 and the seal member 74 is disposed between the boost piston 30 and the cylinder 62. In addition, the seal member 74 facing the first chamber 64a is disposed between a piston small-diameter portion 30d and the plug 72. That is, until the elastic deformation of the seal members 70 and 74 facing the second chamber 64b stops, the hydraulic fluid flows into the fluid chamber 64. Accordingly, in the embodiment, when the pressure in the first chamber 64a rises to the startup hydraulic pressure of the boost piston 30 and the boost piston 30 starts moving, the state in which the hydraulic fluid is flowing in the fluid chamber 64 can be achieved. This can reduce an oil impact caused in the fluid chamber 64 (first chamber 64a). In addition, since the amount (the amount of reduction of the seal member 74) of fluid consumption by the seal member 74 facing the first chamber 64a in which an oil impact may occur becomes smaller, the oil impact energy becomes smaller. Since the boost piston 30 starts moving before the elastic deformation of the seal members 70 and 74 facing the second chamber 64b stops in the embodiment, an oil impact does not easily occur in the second chamber 64b. The boost piston 30 operating as described above can be obtained by setting, as appropriate, the shapes and characteristics of the seal members 74, 70, and 74 as elastic members, the restriction amount of the restricting flow path 64c, and the volumes of the first chamber 64a and the second chamber 64b.

Figure 4:
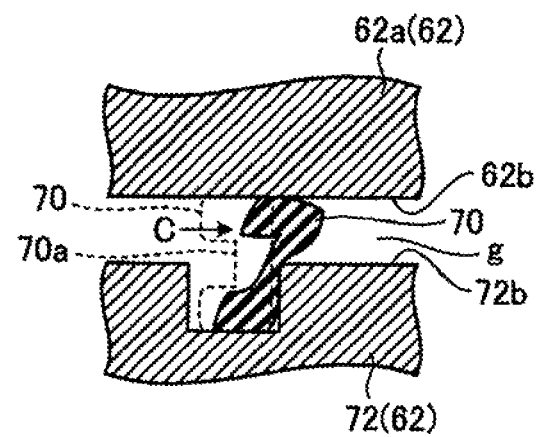
FIG. 4 an explanatory diagram illustrating an example of a seal member applied to the hydraulic braking device according to the embodiment.

In the embodiment, the seal member 70 that keeps the amount of fluid consumption while ensuring the liquid tightness of the second chamber 64b is attachable to an outer surface 72b (outer peripheral surface) of the annular plug 72, which is a part of the cylinder 62 sealing the end surface opening of the cylinder 62. Male threads are formed on the outer surface 72b of the plug 72 and female threads are formed on the cylindrical inner surface 62b (inner peripheral surface) of the cylinder member 62a, which is a part of the cylinder 62. Binding between the male threads and the female threads integrates the plug 72 with the cylinder member 62a. That is, at least a part of the plug 72 is housed in the tube of the cylinder member 62a (cylinder 62). As illustrated in FIG. 4, the seal member 70 elastically deforms between the inner surface 62b of the cylinder member 62a and the outer surface 72b of the plug 72 to seal a gap g between the inner surface 62b and the outer surface 72b, and ensure the liquid tightness of the second chamber 64b (fluid chamber 64). In addition, the seal member 70 elastically deforms in response to the hydraulic fluid flowing into the second chamber 64b to temporarily expand the volume of the second chamber 64b and increase the amount of fluid consumption. The plug 72 may be integrated with the cylinder member 62a by swaging or pressure-fitting or the like.

FIG. 4 illustrates the cross sectional shape of the seal member 70 and an aspect of elastic deformation. The seal member 70 is, for example, an annular seal member that can be housed in a seal groove formed on the outer peripheral surface of the plug 72 and a groove 70a, opened toward the side surface in contact with the hydraulic fluid, which extends in the circumferential direction may be formed. The seal member 70 may be made of elastomer having a good oil resistance and good wear resistance and having a predetermined elastic force. As illustrated in FIG. 4, the seal member 70 has a substantially C-shaped cross section. When the spool 66 is in the close state (the brake pedal 24 is not depressed), the seal member 70 is crashed between the cylinder 62 and the plug 72 as illustrated by the dashed line to ensure the liquid tightness. In contrast, when the spool 66 makes a transition to the open state and the highly pressurized hydraulic fluid flows into the second chamber 64b via the restricting flow path 64c, the seal member 70 elastically deforms in the direction (for example, the direction indicated by arrow C) in which the volume of the second chamber 64b is expanded. Also in the process of the elastic deformation, the seal member 70 causes the hydraulic fluid to flow in the second chamber 64b while ensuring the liquid tightness state. The hydraulic fluid continues flowing until the elastic deformation of the seal member 70 stops. When depression of the brake pedal 24 is released and the hydraulic pressure in the second chamber 64 is reduced, the seal member 70 restores to the initial shape illustrated by the dashed line in FIG. 4 to return the volume of the second chamber 64b to the initial state. That is, the volume is restored so as to increase the amount of fluid consumption the next time the hydraulic fluid flows into the second chamber 64b.

Figure 5:
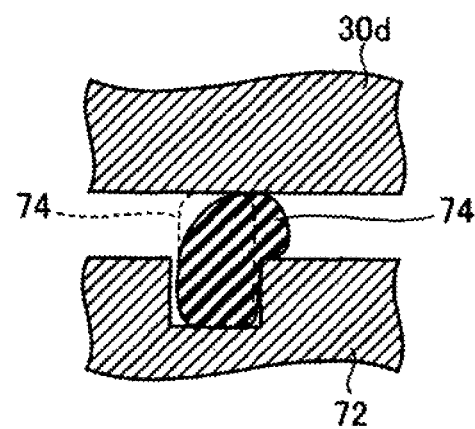
FIG. 5 is an explanatory diagram illustrating another example of a seal member applicable to the hydraulic braking device according to the embodiment.

FIG. 5 illustrates the seal member 74 applicable to the gap between the plug 72 and the piston small-diameter portion 30d in the part close to the first chamber 64a. The seal member 74 has, for example, a circular or elliptic cross section. The seal member 74 may be made of elastomer having a good oil resistance and good wear resistance and having a predetermined elastic force and the seal member 74 may be made of, for example, nitrile rubber or silicone rubber. The seal member 74 has a shape for reducing the amount of elastic deformation as compared with the seal member 70. In addition, the amount of elastic deformation may be reduced by changing the material. Although FIG. 2 illustrates an example in which the seal member 74 is disposed between the boost piston 30 and the cylinder 62 in the part close to the second chamber 64b, the seal member 70 may be disposed so that the groove 70a is oriented to the second chamber 64b. As the part other than the fluid chamber 64 of the hydraulic booster 14 and a seal member 76 used in the master cylinder 12, the seal member 74 for which the amount of fluid consumption is relatively small can be used. In this case, reduction in the response by the amount of fluid consumption can be suppressed.

Next, the restricting flow path 64c will be described. As illustrated in FIG. 3, the restricting flow path 64c is formed between, for example, an end portion 30e of the boost piston 30 and the inner wall surface (the end surface 72a of the plug 72, which is a part of the cylinder 62, in the embodiment) of the cylinder facing the end portion 30e. Specifically, the restricting flow path 64c is formed as a groove (slit, notch, or opening) in an annular wall part 30f (dividing wall) that is provided in the end portion 30e of the boost piston 30 and performs partitioning between the first chamber 64a and the second chamber 64b. In this example, the restriction amount of the restricting flow path 64c can be adjusted by adjusting the number of grooves, the cross sectional area, the depth, the length, and the like.

Figure 6:
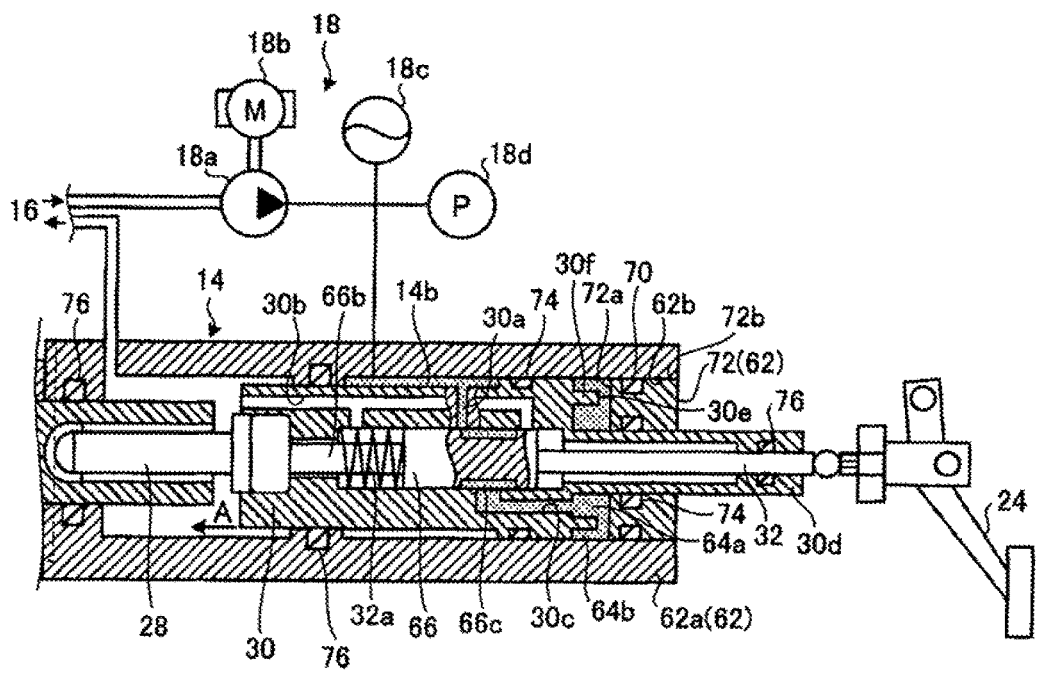
FIG. 6 is an explanatory diagram illustrating the state after an assisting piston of the hydraulic braking device according to the embodiment starts moving.

When the hydraulic pressure of the hydraulic fluid introduced to the first chamber 64a reaches the startup hydraulic pressure of the boost piston 30, the boost piston 30 starts moving in the direction indicated by arrow A as illustrated in FIG. 6. As a result, the end portion 30e of the boost piston 30 is separated from the end surface 72a of the plug 72 (the cylinder 62), the restriction of the restricting flow path 64c is extended, and restriction effects are lost. Accordingly, inflow of the hydraulic fluid becomes easy. Then, as described above, the boost piston 30 moves the booster rod 28 in the direction indicated by arrow A, moves the primary piston 12c in the direction indicated by arrow A, and generates a hydraulic pressure to cause the brake device 20 to generate a braking force in the master cylinder 12. The flow amount of the hydraulic fluid supplied from the accumulator 18c is determined by the spool 66 that moves according to the amount of depression of the brake pedal 24. Therefore, the amount of the hydraulic fluid flowing into the fluid chamber 64 (the first chamber 64a and the second chamber 64b) is also determined according to the amount (the braking amount requested by the driver) of depression of the brake pedal 24. As a result, the boost piston 30 generates an assisting force that depends on the amount of depression of the brake pedal 24 and assists the generation of a hydraulic pressure in the master cylinder 12.

Figure 7:
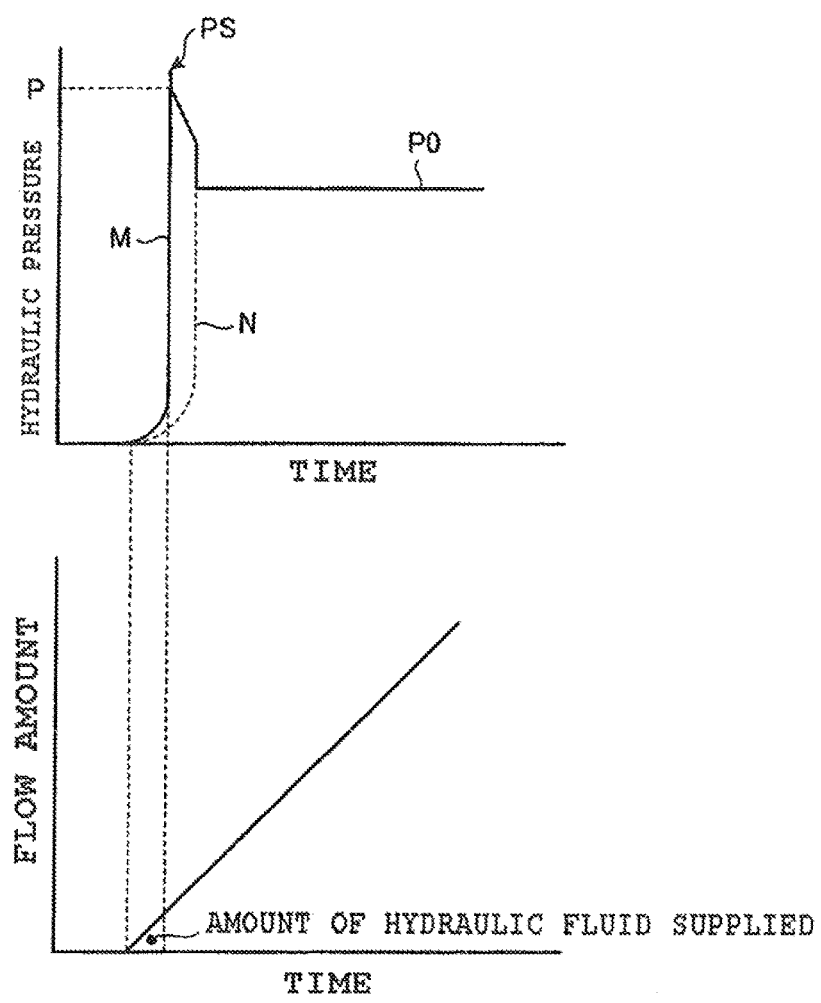
FIG. 7 is an explanatory diagram illustrating the progression of the hydraulic pressure in the fluid chamber of the hydraulic braking device according to the embodiment and the progression of the flow amount of the fluid at this time.
Figure 8:
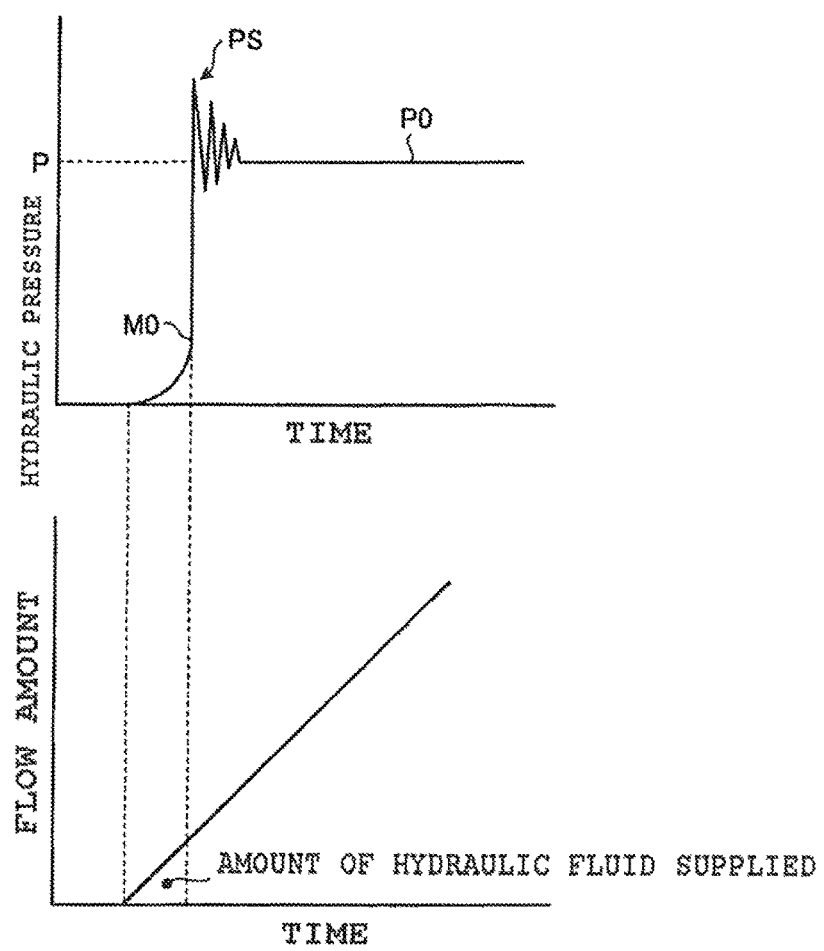
FIG. 8 is a comparative example for FIG. 7 and an explanatory diagram illustrating the progression of the hydraulic pressure in the fluid chamber that is not partitioned and the progression of the flow amount of the fluid at this time.

FIG. 7 illustrates a specific example of the behavior of the hydraulic fluid and progression of the hydraulic pressure in the fluid chamber 64 of the hydraulic booster 14 configured as described above. An aspect of generation of an assisting force when the hydraulic fluid flows from the accumulator 18c will be described. FIG. 8 illustrates, as a comparative example, the progression of the hydraulic pressure when the fluid chamber is not partitioned into the first chamber and the second chamber. In the upper part in FIG. 7, the solid line indicates the progression of the hydraulic pressure in the first chamber 64a and the dashed line indicates the progression of the hydraulic pressure in the second chamber 64b. The lower part in FIG. 7 illustrates the progression of the flow amount of the hydraulic fluid flowing into the fluid chamber 64. The upper part in FIG. 8 illustrates the progression of the hydraulic pressure in the fluid chamber (no partitioning) and the lower part illustrates the progression of the flow amount of the hydraulic fluid flowing into the fluid chamber (no partitioning).

When the brake pedal 24 is depressed and the push rod 32 and the spool 66 move in the direction indicated by arrow A, the high pressure introduction path 30a communicates with the annular groove 66c and the hydraulic fluid flows into 30c. As illustrated in FIG. 7 and FIG. 8, before the boost piston 30 starts up, a rise (solid line M in FIG. 7) in the hydraulic pressure in the first chamber 64a from the inflow of the hydraulic fluid is earlier than a rise (solid line MO in FIG. 8) in the hydraulic pressure in the case in which there is not partitioning into the first chamber 64a and the second chamber 64b. Although the hydraulic fluid also flows into the second chamber 64b at this time, because of restriction effects when the hydraulic fluid passes through the restricting flow path 64c, as illustrated by the dashed line N in the upper part in FIG. 7, a rise in the hydraulic pressure in the first chamber 64b is delayed from a rise in the hydraulic pressure in the first chamber 64a. That is, in the state in which the hydraulic fluid is flowing in the second chamber 64b, the hydraulic pressure in the first chamber 64a can be raised earlier than in the second chamber 64b so as to reach the startup hydraulic pressure P of the boost piston 30. In addition, in the second chamber 64b, the inflow of the hydraulic fluid causes the elastically deformable seal members 70 and 74 to expand the volume of the second chamber 64b and the hydraulic fluid continues to flow into the second chamber 64b even when the hydraulic pressure is rising in the first chamber 64a. Although the boost piston 30 actually starts moving in the direction indicated by arrow A at the startup hydraulic pressure P, the hydraulic pressure having suddenly risen performs overshooting to the hydraulic pressure PS. As illustrated in the lower part in FIG. 7, the overshooting is caused so as to correspond to the flow amount (the amount of the hydraulic fluid supplied) of the hydraulic fluid having flowed into the first chamber 64a until the boost piston 30 starts up. After that, when the boost piston 30 starts up, the restriction of the restricting flow path 64c is lost, the hydraulic pressure in the second chamber 64b increases while the hydraulic pressure in the first chamber 64a reduces, and the hydraulic pressure settles at the operational hydraulic pressure P0 (determined by the biasing force by the spring 12e of the master cylinder 12 or the like) required for the stable movement after startup. FIG. 7 is exaggerated to make the difference between fluctuations in the hydraulic pressures in the first chamber 64a and the second chamber 64b clear.

As described above, an oil impact during startup of the boost piston 30 is caused by a sudden change (for example, a flow stop) in the speed of the hydraulic fluid. As illustrated in the comparative example in FIG. 8, in the case of a single fluid chamber having no partitioning, the hydraulic pressure in the fluid chamber rises to the startup hydraulic pressure P. In this case, the area of the part of the fluid chamber having no partitioning to which the hydraulic pressure is applied is larger than in the first chamber 64a. As a result, as illustrated in FIG. 7, the startup hydraulic pressure P of the boost piston 30 is smaller than the startup hydraulic pressure P of the first chamber 64a having partitioning and is substantially equal to or slightly larger than the operational hydraulic pressure P0 required for the boost piston 30 to perform stable movement after startup. Also in the case of a hydraulic booster including a fluid chamber having no partitioning, the startup hydraulic pressure P performs overshooting to the hydraulic pressure PS. In this case, since the flow of the hydraulic fluid substantially stops immediately before the boost piston 30 starts up, an oil impact occurs at this time. In addition, as illustrated in the lower part of FIG. 8, since the flow amount (the amount of hydraulic fluid supplied) of the hydraulic fluid flowing into the fluid chamber before the boost piston 30 starts up is larger than that of the first chamber 64a having partitioning. This is because the amount of fluid consumption (when there is no partitioning) caused by the seal member is larger than in the first chamber 64a. Since the amount of the hydraulic fluid flowing into the fluid chamber until the boost piston 30 starts up is larger, an oil impact increases and overshooting increases. In addition, as the time required for the hydraulic pressure to settle at the operational hydraulic pressure P0 after the boost piston 30 starts up becomes longer, hydraulic pressure fluctuations (vibrations) become larger. Therefore, vibrations and abnormal noises associated with an oil impact also become larger.

In contrast, when the fluid chamber 64 is partitioned into the first chamber 64a and the second chamber 64b via the restricting flow path 64c as in the embodiment and the seal member 70 having a relatively large amount of fluid consumption is disposed in the part close to the second chamber 64b, the flow amount until the boost piston 30 starts up can be reduced as illustrated in the lower part in FIG. 7. In addition, the pressure can reach the startup hydraulic pressure of the boost piston 30 when the hydraulic fluid is flowing. Therefore, occurrence of an oil impact can be reduced by mitigating the occurrence of a sudden change in the speed of the hydraulic fluid during startup of the boost piston 30. In addition, overshooting caused by the flow amount of the hydraulic fluid until the boost piston 30 starts up is also reduced and occurrence of vibrations and abnormal noises during the startup of the boost piston 30 can be reduced.

The restriction opening area of the restricting flow path 64c in the embodiment can be determined based on an experiment or the like so that the hydraulic pressure in the first chamber 64a can rise to the startup hydraulic pressure of the boost piston 30 before the amount of fluid consumption by the elastic deformation of the seal members 70 and 74 in the second chamber 64b is reached.

Although the above embodiment adopts an example in which the seal member 70 compared with the seal member 74, having a relatively large amount of fluid consumption compared with the seal member 74, is disposed in the part close to the second chamber 64b, two seal members 74 may also be disposed in the part close to the second chamber 64b in another embodiment. Also in this case, more seal members than the seal members disposed in the part close to the first chamber 64a are disposed, so the second chamber 64b has an amount of fluid consumption relatively larger than in the first chamber 64a and the same effects as in the case in which the seal member 70 is used can be obtained. Since the same seal members are used in this case, it is possible to contribute to cost reduction and improvement of the flexibility of design. The restriction state of the restricting flow path 64c only needs to be set to achieve the differential pressure for raising the hydraulic pressure in the first chamber 64a to the startup hydraulic pressure of the boost piston 30 before the amount of fluid consumption of the second chamber 64b is reached. Therefore, an oil impact can be reduced while the freedom in the selection of the seal members is ensured.

As described above, in the above embodiment, an oil impact can be reduced and occurrence of vibrations and abnormal noises associated with the oil impact can be reduced by partitioning the fluid chamber 64 into the first chamber 64a and the second chamber 64b via the restricting flow path 64c. Since an additional structure for reducing an oil impact does not need to be provided separately and the structure of the hydraulic booster 14 does not need to be changed significantly, it is possible to achieve the size reduction and the improvement of the performance of the braking system 10 including the hydraulic booster 14 while suppressing an increase in the production cost, design cost, and the like.

As described above, the hydraulic braking device according to the embodiment includes, for example, the tubular cylinder 62, the boost piston 30 (assisting piston) housed in the cylinder 62 so as to be movable reciprocally, the boost piston 30 facing the fluid chamber 64 formed in the cylinder 62, the boost piston 30 assisting the primary piston 12c (master piston) of the master cylinder 12 generating a hydraulic pressure for generating a braking force when moved from a location on one side to another side in a reciprocal movement direction by a hydraulic fluid (brake fluid or fluid) flowing into the fluid chamber 64 from the hydraulic source 18 (supply source), and the elastically deformable seal member 74 sealing the fluid chamber 64. When the boost piston 30 is present at the location on the one side, the fluid chamber 64 is partitioned into the first chamber 64a and the second chamber 64b, the first chamber 64a communicating with the hydraulic source 18, the second chamber 64b communicating with the first chamber 64a via the restricting flow path 64c, and the seal member 74 seals the second chamber 64b. In the structure, for example, the restriction effects of the restricting flow path 64c cause the hydraulic pressure in the first chamber 64a to rise earlier than the hydraulic pressure in the second chamber 64b. In addition, before the amount of fluid consumption by the elastic deformation of the seal member 74 disposed in the second chamber 64b is reached, the hydraulic pressure in the first chamber 64a can be raised to the startup hydraulic pressure of the boost piston 30 early. As a result, an oil impact during startup of the boost piston 30 can be reduced.

In addition, in the hydraulic braking device according to the embodiment, for example, when the boost piston 30 is present at the location on the one side and the fluid is flowing from the first chamber 64a to the second chamber 64b via the restricting flow path 64c in response to the elastic deformation of the seal member 70, the boost piston 30 starts moving from the location on the one side to the other side. In this structure, for example, before the boost piston 30 starts up, it is possible to suppress a sudden change (for example, a flow stop of the hydraulic fluid) in the speed of the hydraulic fluid causing an oil impact. As a result, an oil impact during startup of the boost piston 30 can be reduced.

In addition, in the hydraulic braking device according to the embodiment, for example, when the boost piston 30 is present at the location on one side, the restricting flow path 64c is formed between the end portion 30e of the boost piston 30 and the end surface 72a of the plug 72 (the cylinder 62) facing the end portion 30e. In this structure, for example, the restricting flow path 64c can be formed easily.

In addition, in hydraulic braking device according to the embodiment, for example, the seal member 70 is annular and provided with the groove 70a opened to the side surface in contact with the hydraulic fluid and extending in the circumferential direction. In this structure, for example, the amount of fluid consumption of the second chamber 64b can be increased by increasing the amount of elastic deformation of the seal member 70. That is, it is possible to prevent the amount of fluid consumption from being reached in the second chamber 64b and the flow speed of the hydraulic fluid from suddenly changing (for example, stopping) before the boost piston 30 starts up. As a result, an oil impact caused by a sudden change in the speed of the hydraulic fluid can be reduced.

In addition, in the hydraulic braking device according to the embodiment, for example, at least a part of the cylindrical inner surface 62b of the cylinder member 62a faces the second chamber 64b and the seal member 70 seals the gap g between the cylinder member 62a and the plug 72. Accordingly, in the embodiment, for example, by sealing the gap g, the seal member 70 ensuring the liquid tightness of the second chamber 64b (fluid chamber 64) can be used to reduce an oil impact.

The above embodiment adopts an example in which the restricting flow path 64c is formed by the end portion 30e of the boost piston 30 and the inner wall surface (the end surface 72a of the plug 72) of the cylinder 62 facing the end portion 30e. In another example, the restricting flow path 64c may be formed by providing a communication path (for example, a through hole) in the dividing wall between the first chamber 64a and the second chamber 64b. In this case, the setting of the restriction opening area (that is, the setting of the restriction effects) becomes easier. In contrast, when the restricting flow path 64c is formed by the end portion 30e of the boost piston 30 and the inner wall surface (the end surface 72a of the plug 72) of the cylinder facing the end portion 30e, the restricting flow path 64c is formed more easily. In addition, at least a part of the first chamber, the second chamber, and the restricting flow path and the like provided when the boost piston 30 is in contact with the plug 72 may be provided in the cylinder 62 (the plug 72).

In addition, although the above embodiment adopts an example in which the two seal members 70 are provided in the second chamber 64b, the number of the seal members 70 may be changed as long as the seal function can be ensured and the amount of fluid consumption for maintaining the flow of the hydraulic fluid in the second chamber 64b during startup of the boost piston 30 can be ensured. Although the embodiment adopts an example in which only the seal member 70 is disposed on the outer peripheral surface of the plug 72, the seal member 76 having only the seal function may be disposed on the back surface (the open end of the cylinder 62) of the seal member 70 in another example. In this case, the amount of elastic deformation of the seal member 70 can be increased and the amount of fluid consumption can be adjusted. As a result, it is possible to contribute to the improvement of flexibility in the method for partitioning between the first chamber 64a and the second chamber 64b and the setting of the size and the like of the restricting flow path 64c.

In addition, in the above embodiment, as illustrated in FIG. 1, the hydraulic booster 14 is additionally connected to the master cylinder 12. In another embodiment, the structure of the fluid chamber 64 and the structure of the seal member 70 described above may be applied to the structure in which the master cylinder is integrated with the hydraulic booster and the same effects can be obtained even in this case.

Although an embodiment of the invention has been described above, the above embodiment is only an example and this embodiment does not limit the scope of the invention. The above embodiment may be implemented in other forms and the embodiment is subject to various types of omission, replacement, combination, and change can be performed without departing from the spirit of the invention. In addition, the specifications (such as the structure, type, direction, shape, size, length, width, thickness, height, number of pieces, disposition, position, and material) of individual configurations, shapes, and the like may be changed as appropriate. In addition, configurations may be partially exchanged among a plurality of embodiments.

The invention claimed is:
1. A hydraulic braking device comprising:
a cylinder comprising a tubular cylinder member and a plug, at least a part of the plug being housed in a tube of the tubular cylinder member;
an assisting piston housed in the cylinder so as to be movable reciprocally, the assisting piston facing a fluid chamber formed in the cylinder, the assisting piston assisting a master piston of a master cylinder generating a hydraulic pressure for generating a braking force when moved from a location on one side of the cylinder to a location on an other side of the cylinder in a reciprocal movement direction by a fluid flowing into the fluid chamber from a supply source; and a first seal member disposed between a piston small-diameter portion of the assisting piston and the plug and a second seal member disposed between the tubular cylinder member and the plug, the first seal member and the second seal member being elastically deformable and sealing the fluid chamber, wherein, when the assisting piston is present at the location on the one side, the fluid chamber is partitioned into a first chamber and a second chamber, the first chamber communicating with the supply source, the second chamber communicating with the first chamber via a restricting flow path, the restricting flow path being formed between an end portion of the assisting piston and an end surface on the one side of the cylinder, the end surface facing the end portion, the first seal member and the second seal member seal the first chamber and the second chamber, at least a part of a cylindrical inner surface of the tubular cylinder member faces the second chamber, and the amount of elastic deformation of the first seal member facing the first chamber is smaller than the amount of elastic deformation of the second seal member facing the second chamber.

2. The hydraulic braking device according to claim 1, wherein, when the assisting piston is present at the location on the one side and the fluid is flowing from the first chamber to the second chamber via the restricting flow path, the assisting piston starts moving from the location on the one side of the cylinder to the location on the other side of the cylinder.

3. The hydraulic braking device according to claim 1, wherein the second seal member is annular and provided with a groove, the groove being opened to a side surface in contact with the fluid, the groove extending in a circumferential direction.

* * * * *